United States Patent [19]

Fevrier et al.

[11] Patent Number: 5,185,847
[45] Date of Patent: Feb. 9, 1993

[54] OPTICAL AMPLIFIER IN THE 1.26 μM TO 1.34 μM SPECTRUM RANGE

[75] Inventors: Hervé Fevrier, Massy; Jean-Francois Marcerou, Courcouronnes; Christian Le Sergent, Marcoussis, all of France

[73] Assignee: Alcatel N.V., Amsterdam, Netherlands

[21] Appl. No.: 870,305

[22] Filed: Apr. 17, 1992

[30] Foreign Application Priority Data

Apr. 22, 1991 [FR] France ................. 91 04929

[51] Int. Cl.$^5$ .......................... G02B 6/00; H01J 3/30
[52] U.S. Cl. .......................... 385/141; 385/131; 385/132; 372/7; 372/40; 372/70; 359/343; 359/345
[58] Field of Search ............. 385/129, 130, 131, 132, 385/141; 372/6, 7, 39, 40, 43, 68, 69, 70, 71; 359/333, 341, 342, 343, 344, 345

[56] References Cited

U.S. PATENT DOCUMENTS

| | | | |
|---|---|---|---|
| 4,788,687 | 11/1988 | Miniscalco et al. | 372/40 |
| 4,962,995 | 10/1990 | Andrews et al. | 372/6 X |
| 4,993,034 | 2/1991 | Aoki et al. | 372/40 |
| 5,007,698 | 4/1991 | Sasaki et al. | 372/6 X |
| 5,042,039 | 8/1991 | Edagawa et al. | 372/6 |
| 5,101,461 | 3/1992 | Nakajima | 372/7 |
| 5,107,538 | 4/1992 | Benton et al. | 385/130 |
| 5,119,460 | 6/1992 | Bruce et al. | 372/6 X |
| 5,128,801 | 7/1992 | Jansen et al. | 372/40 |
| 5,131,069 | 7/1992 | Hall et al. | 385/141 X |
| 5,136,420 | 8/1992 | Inagaki et al. | 372/6 X |

OTHER PUBLICATIONS

Electronics Letters, vol. 27, No. 2, Jan. 17, 1991, Enage-GB, pp. 189-191; J. Y. Allain et al.: "Tunable cw lasing around 610, 695, 715, 885 and 910 in praseodymium-doped fluorozirconate fibre.".
SPIE, vol. 1128, 1989, pp. 142-144; S. Iraj Najafi et al.: "Ion-exchanged rare-earth doped waveguides.".

Primary Examiner—Brian Healy

[57] ABSTRACT

An optical amplifier in the 1.26 μm to 1.34 μm spectrum range, comprising a solid substrate of fluoride glass doped with praseodymium in which a three-dimensional monomode waveguide is formed having an index difference Δn relative to the index of the fluoride glass lying in the range $4 \times 10^{-3}$ and $8 \times 10^{-2}$, said waveguide being associated by coupling means to an optical pump having a wavelength equal to 1.02 μm ±0.1 μm.

8 Claims, 1 Drawing Sheet

OPTICAL AMPLIFIER IN THE 1.26 μM TO 1.34 μM SPECTRUM RANGE

The present invention relates to an optical amplifier in the 1.26 μm to 1.34 μm spectrum range, and is particularly applicable to analog telecommunications systems by optical fiber.

BACKGROUND OF THE INVENTION

The article entitled "$Pr^{3+}$ doped fluoride fiber amplifier operating at 1.31 μm" by Y. Ohishi, T. Kanamori, T. Kitagawa, S. Takahashi, E. Snitzer, and G. H. Sigel, published in Proceedings OFC' 91, paper PD2, San Diego 1991, discloses an optical amplifier using a fluoride glass optical fiber doped with praseodymium. The confinement of optical power in such a monomode fiber makes it possible to obtain a population inversion that gives rise to stimulated emission in the 1.26 μm to 1.34 μm spectrum range.

If the term "net gain" is used for the ratio expressed in dB of the signal at the outlet from the amplifying medium divided by the signal at the inlet thereto, then the net gain of the above-mentioned fiber amplifier is 5.1 dB at 1.31 μm for a pumping power of 180 mW at 1.017 μm.

However, it appears that presently-known fluoride fibers possess relatively poor mechanical properties. Firstly they are small in section having a radius of about 60 μm, and secondly they are very sensitive to pollution from the outside environment, which makes them even more fragile.

An object of the present invention is to provide an optical amplifier in the 1.26 μm to 1.34 μm spectrum range having mechanical properties that are better than those of presently known doped optical fiber amplifiers.

SUMMARY OF THE INVENTION

The present invention provides an optical amplifier in the 1.26 μm to 1.34 μm spectrum range, the amplifier comprising a solid substrate of fluoride glass doped with praseodymium in which a three-dimensional monomode waveguide is formed having an index difference An relative to the index of the fluoride glass lying in the range $4 \times 10^{-3}$ and $8 \times 10^{-2}$, said waveguide being associated by coupling means with an optical pump having a wavelength equal to 1.02 μm ±0.1 μm.

In one embodiment, said waveguide is obtained by localized diffusion of lead into said fluoride glass.

The lead may be replaced by any material that is compatible with fluoride glass and that enables the above-specified index difference to be obtained.

Advantageously, the said waveguide is covered in a layer of fluoride glass of the same nature as the said substrate, but not doped with praseodymium; the thickness of said layer should be not less than 100 μm, and it is intended to limit losses from the waveguide.

Whether or not said waveguide is covered with said layer, an additional coating of epoxy resin that does not pollute fluoride glass is provided, such as a polyurethane resin that can be cured by ultraviolet radiation, for example.

The fluoride glass may be ZBLAN or BIZYT.

ZBLAN is a glass having the following composition: $ZrF_4$, $BaF_2$, $LaF_3$, $AlF_3$, $NaF$. BIZYT is a glass having the following composition: $BaF_2$, $InF_3$, $ZnF_2$, $YF_3$, $ThF_4$.

Said fluoride glass is preferably doped with praseodymium to a concentration lying in the range 0.1% to 2% by weight. The fluoride glass may also be doped with ytterbium to a concentration lying in the range 0.1% to 10% by weight.

In an advantageous embodiment, said waveguide has a length lying in the range 20 mm to 200 mm, a width lying in the range 0.8 μm to 6 μm, and a thickness lying in the range 0.8 μm to 6 μm.

BRIEF DESCRIPTION OF THE DRAWING

Embodiments of the invention are described by way of example with reference to the accompanying drawings, in which.

DETAILED DESCRIPTION

Figure 1:
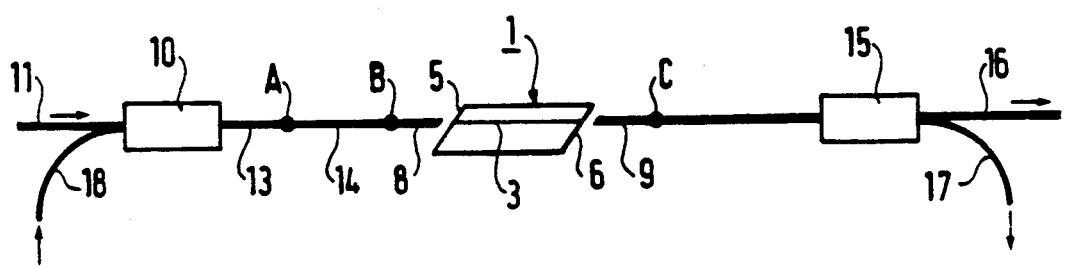
FIG. 1 is a highly diagrammatic view of an amplifier of the invention.
Figure 2:
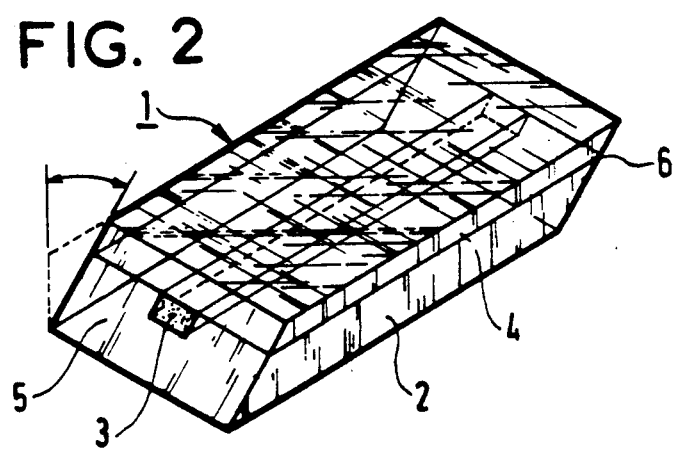
FIG. 2 is a highly diagragmatic perspective view of the waveguide belonging to the amplifier of the invention.

FIGS. 1 and 2 show the main part 1 of the amplifier of the invention. It comprises a substrate 2 made of ZBLAN fluoride glass doped with praseodymium to a concentration of 0.5% by weight. A monomode waveguide 3 is formed in the substrate by lead diffusion using a method that is known per se. The index difference between the glass of the waveguide and the glass of the substrate is $2 \times 10^{-2}$. The length of the waveguide 3 is 150 mm. Its width is 4 μm, as is its height. The mode diameter is 4.5 μm for a wavelength of 1.3 μm.

The top face of the guide is covered, e.g. using a chemical vapor deposition (CVD) method, with a 100 μm thick layer 4 of the same fluoride glass as the substrate 2, but not doped with praseodymium. The inlet face 5 and the outlet face 6 of the part 1 are polished and slope slightly relative to the axis of the waveguide 3, e.g. at a angle of 14°. The polishing quality must be at least λ/10. These dispositions serve to avoid any reflection that could give rise to a laser effect.

An optical fiber multiplexer 10 receives signals at 1.3 μm via its inlet fiber 11, and it is connected to a light pump emitting at 1.008 μm via its inlet fiber 12. Its outlet fiber 13 is connected to the inlet face 5 of the waveguide 3 via a length of fiber 14 having an index difference $\Delta n = 25 \times 10^{-3}$ and followed by an inclined connector 8. The fiber 14 serves to match the outlet mode from the multiplexer to the mode of the waveguide 3 at the signal and the pumping wavelength. This fiber gives rise to a loss of about 0.2 dB (between points A and B). The inclined connector 8 has the face of its outlet fiber inclined at an angle of 14° relative to its axis. A connector 9 analogous to the connector 8 is provided facing the outlet face 6 of the waveguide 2.

The net gain of the amplifier of the invention is measured between points A and C.

A demultiplexer 15 is disposed at the outlet C, having an outlet fiber 17 for the pumping energy at 1.008 μm and an outlet fiber 16 for the amplified signal at 1.3 μm.

Figure 3:
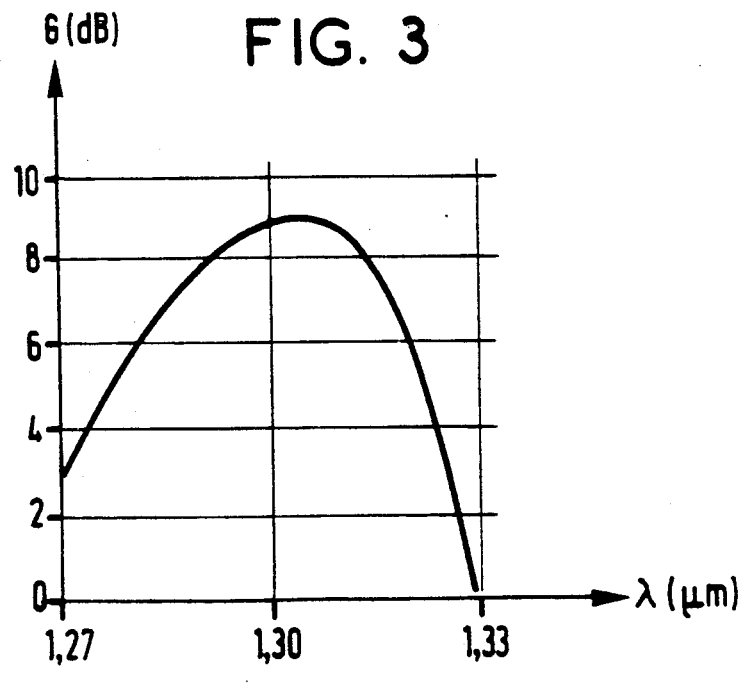
FIG. 3 is a graph showing how the net gain G (in dB) of the FIG. 1 amplifier varies as a function of the wavelength λ (in μm) of the input signal.

FIG. 3 shows how the net gain with a pumping power of 1.3 watts varies for an input signal at a power of 10 μ watts whose wavelength varies over the range 1.27 μm to 1.33 μm.

The gain obtained is sufficient for the intended application.

In a variant embodiment, a substrate 2 is used that is co-doped with ytterbium to a concentration of 0.5% by weight. The length of the waveguide is 130 mm.

A pump is implemented that delivers 600 mW at 990 nm and a net gain of 12 dB is obtained for a signal at a wavelength of 1.298 μm. The net gain can be further increased by optimizing the praseodymium/ytterbium co-doping so as to improve the ytterbium to praseodymium transfer possibilities.

Naturally, the invention is not limited to the embodiments described. Without going beyond the ambit of the invention, any means could be replaced by equivalent means.

We claim:

1. An optical amplifier in the 1.26 μm to 1.34 μm spectrum range, comprising a solid substrate of fluoride glass doped with praseodymium in which a three-dimensional monomode waveguide is formed having an index difference Δn relative to the index of the fluoride glass lying in the range $4 \times 10^{-3}$ and $8 \times 10^{-2}$, said waveguide being associated by coupling means with an optical pump having a wavelength equal to 1.02 μm ±0.1 μm.

2. An optical amplifier according to claim 1, wherein said waveguide is obtained by localized diffusion of lead into said fluoride glass.

3. An optical amplifier according to claim 1, wherein said waveguide is covered with a layer of fluoride glass to a thickness of not less than 100 μm.

4. An optical amplifier according to claim 1, provided with a coating of resin that does not pollute fluoride glass.

5. An optical amplifier according to claim 1, wherein said fluoride glass is selected from ZBLAN and BIZYT.

6. An optical amplifier according to claim 1, wherein said fluoride glass is doped with praseodymium to a concentration lying in the range 0.1% to 2% by weight.

7. An optical amplifier according to claim 6, wherein said fluoride glass is also doped with ytterbium to a concentration lying in the range 0.1% to 10% by weight.

8. An optical amplifier according to claim 1, wherein said waveguide has a length lying in the range 20 mm to 200 mm, a width lying in the range 0.8 μm to 6 μm, and a thickness lying in the range 0.8 μm to 6 μm.

* * * * *